United States Patent
Mogi et al.

(10) Patent No.: US 10,474,301 B2
(45) Date of Patent: Nov. 12, 2019

(54) INPUT DEVICE DETECTING BOTH OF POSITION AND APPLIED WEIGHT

(71) Applicant: Alps Alpine Co., Ltd., Ota-ku, Tokyo (JP)

(72) Inventors: Toshiyuki Mogi, Niigata-ken (JP); Isao Asano, Niigata-ken (JP)

(73) Assignee: Alps Alpine Co., Ltd., Tokyo (JP)

(*) Notice: Subject to any disclaimer, the term of this patent is extended or adjusted under 35 U.S.C. 154(b) by 0 days.

(21) Appl. No.: 15/814,218

(22) Filed: Nov. 15, 2017

(65) Prior Publication Data
US 2018/0074620 A1 Mar. 15, 2018

Related U.S. Application Data

(63) Continuation of application No. PCT/JP2016/065667, filed on May 27, 2016.

(30) Foreign Application Priority Data

Aug. 31, 2015 (JP) ................................ 2015-170635

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .......... G06F 3/044; G06F 2203/04105; G06F 2203/04103; G06F 2203/04111

(Continued)

(56) References Cited

U.S. PATENT DOCUMENTS

2007/0229464 A1 10/2007 Hotelling et al.
2010/0128002 A1* 5/2010 Stacy ............... G06F 3/016
345/174

(Continued)

FOREIGN PATENT DOCUMENTS

JP 2007-272898 10/2007
JP 2011-191847 9/2011

(Continued)

OTHER PUBLICATIONS

International Search Report from International Application No. PCT/JP2016/065667 dated Jul. 5, 2016.

*Primary Examiner* — Jonathan M Blancha
(74) *Attorney, Agent, or Firm* — Beyer Law Group LLP (57) ABSTRACT

As an input device that can detect both a position and an applied weight and has a thin thickness and improved waterproof and dustproof performance, an input device is provided that has a position detection part provided on a base material, the position detection part having a plurality detection electrodes, and also has a load detection wire provided among the plurality of detection electrodes in the position detection part, the electric resistance value of the load detection wire changing depending on pressure. In the input device, the plurality of detection electrodes may have first electrodes and second electrodes that both extend in mutually intersecting directions, each first electrode may have a bridge wiring part provided at an intersection position between the first electrode and the second electrode, and the load detection wire may be provided so as to intersect the bridge wire.

21 Claims, 6 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2011/0037721 A1* | 2/2011 | Cranfill ................. | G06F 3/0414 |
| | | | 345/174 |
| 2012/0146942 A1* | 6/2012 | Kamoshida ............. | G06F 3/044 |
| | | | 345/174 |
| 2013/0271675 A1* | 10/2013 | Misaki .................... | G06F 3/044 |
| | | | 349/12 |
| 2014/0152618 A1 | 6/2014 | Ando | |
| 2015/0070305 A1* | 3/2015 | Seo ....................... | G06F 3/0412 |
| | | | 345/174 |
| 2015/0277606 A1* | 10/2015 | Kim ....................... | G06F 3/044 |
| | | | 345/174 |

FOREIGN PATENT DOCUMENTS

| | | |
|---|---|---|
| JP | 2015-41160 | 3/2015 |
| WO | 2010/062901 | 6/2010 |
| WO | 2013/021835 | 2/2013 |

\* cited by examiner

INPUT DEVICE DETECTING BOTH OF POSITION AND APPLIED WEIGHT

CLAIM OF PRIORITY

This application is a Continuation of International Application No. PCT/JP2016/065667 filed on May 27, 2016, which claims benefit of Japanese Patent Application No. 2015-170635 filed on Aug. 31, 2015. The entire contents of each application noted above are hereby incorporated by reference.

BACKGROUND OF THE INVENTION

1. Field of the Invention

The present invention relates to an input device, and more particularly to an input device that includes a plurality of detection electrodes used to detect a position on a base material.

2. Description of the Related Art

In various types of information processing apparatuses, a translucent input device is placed in front of a color liquid crystal display panel. This type of input device is called a touch panel. In a touch panel, capacitance is formed between electrodes. When a finger of a person comes close to the touch panel, a change occurs in the movement of charges. The coordinates of the close position of the finger is determined from this change. To detect the change in the movement of charges, a capacitive sensor is used.

Japanese Unexamined Patent Application Publication No. 2011-191847 describes a structure in which bridge wires are provided at intersecting portions of a plurality of mutually intersecting wires. In this structure, a bridge wire is formed at each intersecting portion of the plurality of wires with an insulating layer interposed, assuring an insulation property among the plurality of mutually intersecting wires.

Japanese Unexamined Patent Application Publication No. 2007-272898 describes a force imaging touch pad in which a force measuring system is provided as part of a touch pad input device. This force imaging touch pad includes a first set of conductive traces and a second set of conductive traces, these sets being separated by a spring membrane. When a force is applied to the force imaging touch pad, the spring membrane is deformed, moving the two sets of conductive traces closer together. This causes a mutual capacitance to change. This change is used to create an image indicating the amount or intensity of the applied force.

SUMMARY OF THE INVENTION

However, in a structure in which a means for detecting contact pressure is provided in an input device such as a touch sensor, a variable space is provided to change a spacing between two members depending on pressure. Due to the thickness of this type of variable space, it becomes difficult to reduce the thickness of the input device. Another problem is that waterproof and dustproof performance are lowered.

In an input device that can detect both a position and an applied weight, the input device provided by the present invention has a thin thickness and improved waterproof and dustproof performance.

To solve the above problem, an input device in the present invention is characterized by having: a position detection part provided on a base material, the position detection part having a plurality of detection electrodes; and a load detection wire provided among the plurality of detection electrodes in the position detection part, the electric resistance value of the load detection wire changing depending on pressure. According to this structure, since the load detection wire the electric resistance value of which changes depending on pressure is provided among the plurality of detection electrodes in the position detection part, it becomes possible to detect a load according to a change in the electric resistance value that depends on the pressure applied to the load detection wire, without providing a variable space that would otherwise be needed for pressure detection.

In the input device in the present invention, the load detection wire may be disposed so as to extend in a predetermined direction in the position detection part. Since the electric resistance value of the load detection wire changes depending on pressure, the more the load detection wire extends in the predetermined direction of the position detection part and thereby the longer the length is, the more precision in load detection is improved.

In the input device in the present invention, a plurality of load detection wires may be provided at a predetermined interval. Thus, load detection can be performed in a wide range in the area of the position detection part.

In the input device in the present invention, the plurality of detection electrodes may have first electrodes and second electrodes that both extend in mutually intersecting directions. Each first electrode may have a bridge wiring part provided at an intersection position between the first electrode and the relevant second electrode. The load detection wire may be disposed so as to intersect the bridge wiring part. Thus, intensive pressurization by the protrusion of the bridge wiring part is performed at the intersection position between the load detection wire and the bridge wiring part. Therefore, even if the load is minute, the change in the electric resistance value of the load detection wire can be increased.

In the input device in the present invention, the material of the load detection wire may be the same as the material of the bridge wiring part. Thus, the manufacturing process of the load detection wire is simplified.

The input device in the present invention may further have an island-shaped insulating part provided between the load detection wire and the bridge wiring part. Thus, intensive pressurization by the protrusion of the bridge wiring part and the island-shaped insulating part is performed at the intersection position between the load detection wire and the bridge wiring part. Therefore, even if the load is minute, the change in the electric resistance value of the load detection wire can be increased.

In the input device in the present invention, the load detection wire may have a first wiring part and a second wiring part. When viewed from above the base material, part of the bridge wiring part, part of the island-shaped insulating part, and part of the second wiring part may overlap with one another at the position of the bridge wiring part. At positions other than the bridge wiring part, part of the first wiring part and part of the second wiring part may overlap with each other. Thus, the load detection wire is intensively pressurized at the protrusion of the bridge wiring part and the portion at which the first wiring part and second wiring part overlap with each other. Therefore, even if the load is minute, the change in the electric resistance value of the load detection wire can be increased.

In the input device in the present invention, on the base material, at least part of the load detection wire may be disposed in the same layer as the plurality of detection electrodes. Thus, even when the load detection wire is provided in the position detection part, the input device can be formed without increasing the number of layers in the layer structure.

According to the present invention, in an input device that can detect both a position and a load, it is possible to reduce the thickness of the input device and improve waterproof and dustproof performance, without providing a movable space used to detect a load.

DESCRIPTION OF THE PREFERRED EMBODIMENTS

Embodiments of the present invention will be described below with reference to the drawings. In the descriptions below, like elements will be denoted by like reference characters and repeated descriptions will be appropriately omitted for members that have been described once.

First Embodiment

Figure 1A:
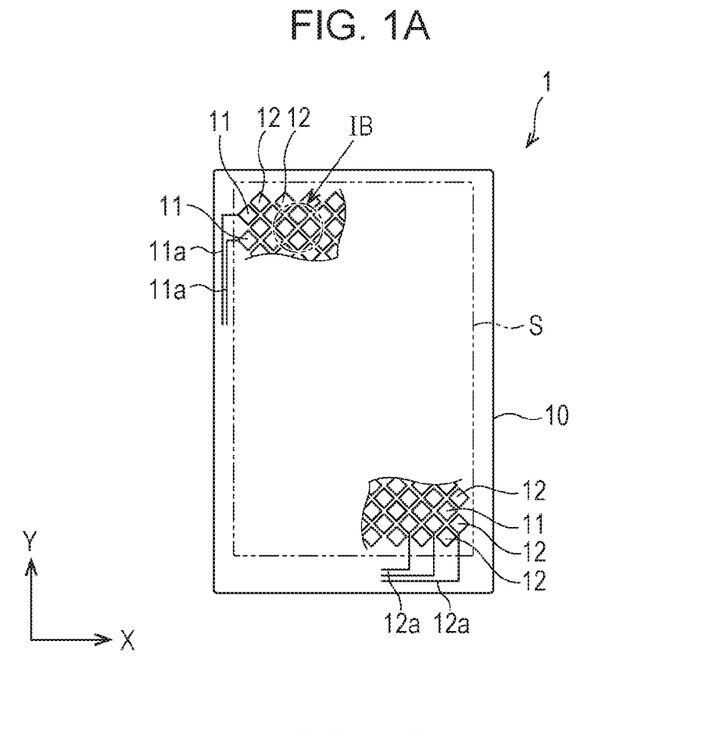
FIGS. 1A and 1B are each a plan view illustrating a capacitive sensor according to a first embodiment.
Figure 1B:
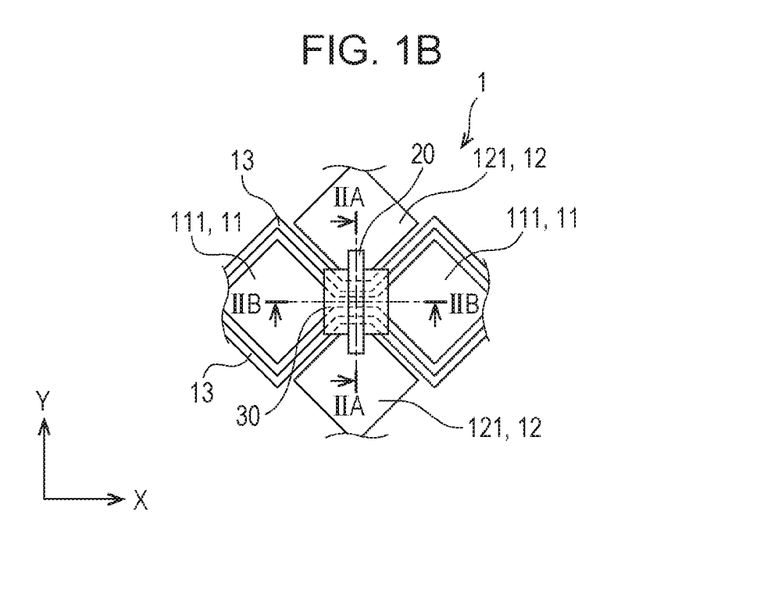

FIGS. 1A and 1B are each a plan view illustrating a capacitive sensor according to a first embodiment. FIG. 1A is an overall view of the capacitive sensor 1. FIG. 1B is an enlarged view of the portion IB in FIG. 1A. In this embodiment, the capacitive sensor 1 is an example of an input device.

As indicated in FIG. 1A, the capacitive sensor 1 according to this embodiment has first electrodes 11 and second electrodes 12 provided in a position detection part S of a base material 10. Each first electrode 11 and each second electrode 12 are a detection electrode that detects a position at which a finger has come into contact with or close to the position detection part S.

The first electrode 11 extends along the front surface of the base material 10 in the X direction, and the second electrode 12 extends along the front surface of the base material 10 in the Y direction, which is orthogonal to the X direction. The first electrode 11 and second electrode 12 are mutually isolated. In this embodiment, a plurality of first electrodes 11 are arranged in the Y direction at a predetermined pitch, and a plurality of second electrodes 12 are arranged in the X direction at a predetermined pitch.

The first electrode 11 has a plurality of first island-shaped electrode parts 111. In this embodiment, the plurality of first island-shaped electrode parts 111, each of which has a shape close to a rhombus, are placed so as to be arranged in the X direction. The second electrode 12 has a plurality of second island-shaped electrode parts 121. The plurality of second island-shaped electrode parts 121, each of which also has a shape close to a rhombus, are placed so as to be arranged in the Y direction.

A lead wire 11a, which is led to the outside of the position detection part S, is connected to each of the plurality of first electrodes 11. A lead wire 12a, which is led to the outside of the position detection part S, is also connected to each of the plurality of second electrodes 12. In the capacitive sensor 1, a change in a current flowing in each lead wire 11a and 12a is detected by a detection circuit (not illustrated). For example, if a finger is brought close to the position detection part S in a state in which a predetermined potential is given to the first electrode 11 and second electrode 12, a change in capacitance occurs between the first electrode 11 and the finger and between the second electrode 12 and the finger. When a potential drop caused by this change in capacitance is detected, X and Y coordinates, in the position detection part S, at which the finger has been brought close to it are determined.

As indicated in FIG. 1B the first electrode 11 and second electrode 12 intersect at a linkage position of two adjacent first island-shaped electrode parts 111 and a linkage position of two adjacent second island-shaped electrode parts 121. A bridge wiring part 20 is provided at this intersection part with an island-shaped insulating part 30 formed between the first electrode 11 and second electrode 12, so the first electrode 11 and second electrode 12 do not come into contact with each other at the intersection part.

In this embodiment, the bridge wiring part 20 is formed so as to span a spacing between two adjacent second island-shaped electrode parts 121. One bridge wiring part 20 is formed between each two adjacent second island-shaped electrode parts 121 arranged in the Y direction. Thus, a plurality of second island-shaped electrode parts 121 become electrically continuous. The island-shaped insulating part 30 is provided between the bridge wiring part 20 and the first electrode 11 and serves to insulate the first electrode 11 and second electrode 12 from each other at the intersection portion.

A load detection wire 13 is provided between a plurality of first island-shaped electrode parts 111 and a plurality of second island-shaped electrode parts 121 in the position detection part S. The electric resistance value of the load detection wire 13 changes depending on pressure. The load detection wire 13 is preferably disposed along spacings between the first island-shaped electrode parts 111 and the second island-shaped electrode parts 121 in a zigzag and extends in, for example, X direction as a whole.

Figure 2A:
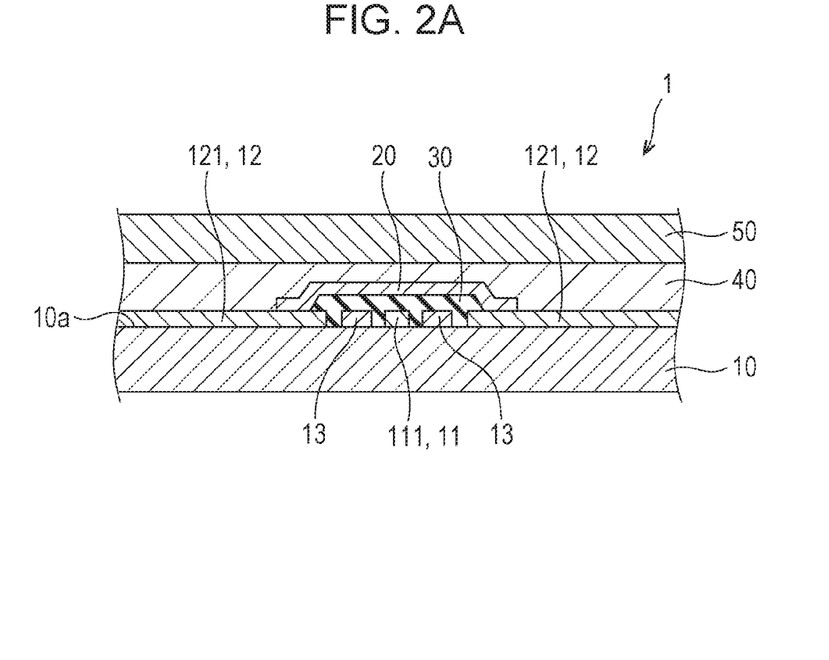
FIGS. 2A and 2B are each a cross-sectional view of part of the capacitive sensor.
Figure 2B:
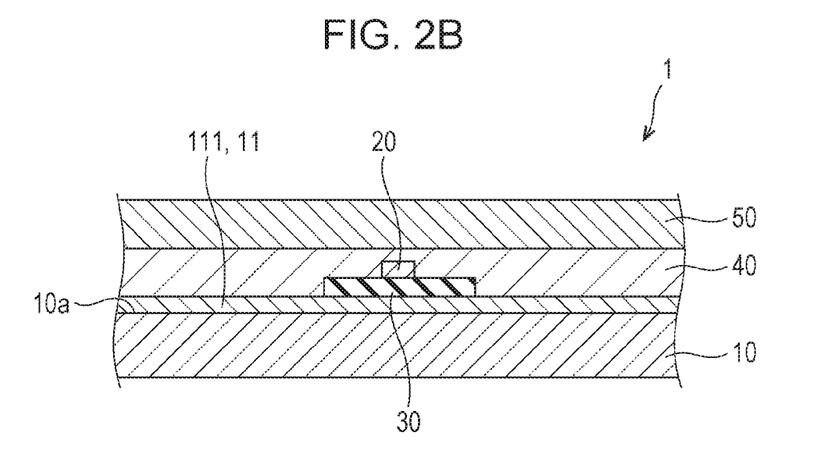

FIGS. 2A and 2B are each a cross-sectional view of part of the capacitive sensor. FIG. 2A is a cross-sectional view taken along line IIA-IIA in FIG. 1B. FIG. 2B is a cross-sectional view taken along line IIB in FIG. 1B.

The first island-shaped electrode parts 111 of the first electrodes 11 and the second island-shaped electrode parts 121 of the second electrodes 12 are placed on a surface 10a of the base material 10. The load detection wire 13 is provided between the first electrodes 11 and the second electrodes 12 on the surface 10a of the base material 10. The load detection wire 13 is disposed on the surface 10a of the base material 10, that is, in the same layer as the first island-shaped electrode parts 111 of the first electrodes 11 and the second island-shaped electrode parts 121 of the second electrodes 12. Thus, even when the load detection wire 13 is provided, an increase in the number of layers is suppressed.

The bridge wiring part 20 is provided between two adjacent second island-shaped electrode parts 121 with the island-shaped insulating part 30 interposed between them. An inter-layer elastic member 40 is provided on the first electrode 11, second electrode 12, and bridge wiring part 20. A protective member 50 is provided on the inter-layer elastic member 40. An optical clear adhesive (OCA), which is an optical transparent adhesive layer, for example, is used as the inter-layer elastic member 40. The inter-layer elastic member 40 has an elastic force that transmits appropriate pressure to the load detection wire 13 when a pressing force is applied from above the protective member 50.

In the capacitive sensor 1 as described above, the electric resistance value of the load detection wire 13 is detected by a detection circuit (not illustrated). That is, when predetermined pressure is applied to the protective member 50 by making a finger come into contact with the top of the protective member 50, the pressure is transmitted to the load detection wire 13. The electric resistance value of the load detection wire 13 changes depending on the pressure that the load detection wire 13 receives. When a change in this electric resistance value is detected with the detection circuit (not illustrated), pressure applied to the load detection wire 13 can be obtained.

In this embodiment, X and Y coordinates, in the position detection part S, at which a finger has made an approach are determined according to a change in capacitance between the first electrode 11 and the finger and between the second electrode 12 and the finger. In addition, pressure when the finger has pressed the position detection part S can be detected by a change in the electric resistance value of the load detection wire 13. Therefore, the position (X and Y coordinates) at which the finger has touched the position detection part S and the pressing force can be obtained in correspondence to each other.

Since the electric resistance value of the load detection wire 13 as described above changes depending on pressure, a load can be detected according to a change in the electric resistance value that depends on the pressure applied to the load detection wire 13, without providing a variable space for pressure detection.

A plurality of load detection wires 13 may be provided in, for example, the Y direction at a predetermined interval. This enables load detection to be performed in a wide range in the position detection part S. If a plurality of load detection wires 13 are provided in a predetermined direction (X direction, for example) at a predetermined interval, it is possible to find, by a calculation, the position in the Y direction to which the highest pressure was applied, due to balance among changes in the electric resistance values of the load detection wires 13. If, for example, a change in electric resistance value occurs in each of two adjacent load detection wires 13, the position of a pressure peak between the two load detection wires 13 can be found by proportionally apportioning an amount by which two electric resistance values changed.

In this embodiment, the load detection wire 13 is provided at a position at which it intersects the bridge wiring part 20. Thus, when pressure is applied by a finger from above the protective member 50, the load detection wire 13 is intensively pressurized by the protrusion of the bridge wiring part 20. Therefore, even if the load is minute, the change in the electric resistance value of the load detection wire 13 can be increased.

Manufacturing Method of the Capacitive Sensor

In the manufacturing of the capacitive sensor 1 according to the present invention, the first island-shaped electrode parts 111 of the first electrode 11, the second island-shaped electrode parts 121 of the second electrode 12, and load detection wire 13 are first formed on the surface 10a of the base material 10.

A glass, an acrylic resin, or a resin sheet, for example, is used for the base material 10. The first electrode 11, second electrode 12, and load detection wire 13 are formed by photolithography and etching or by screen printing. If they are formed by, for example, photolithography and etching, an indium tin oxide (ITO) layer, for example, is formed on the base material 10 by sputtering and a resist is formed on the ITO layer. After the resist is patterned by being exposed to light and developed, the ITO layer is etched. After that, the resist is stripped. Thus, the first electrode 11, second electrode 12, and load detection wire 13, each of which is composed of the ITO layer patterned on the base material 10, are formed.

Next, the island-shaped insulating part 30 is formed at an intersection position between the first electrode 11 and the second electrode 12. The island-shaped insulating part 30 is formed by screen printing or from a dry film resist or a liquid resist. When the island-shaped insulating part 30 is to be formed by screen printing, an insulating material (optical material) having high translucency, for example, is applied by screen printing, after which the insulating material is annealed. When the island-shaped insulating part 30 is to be formed from a dry film resist, a dry film resist having translucency, for example, is pasted, after which it is exposed to light and developed. When the island-shaped insulating part 30 is to be formed from a liquid resist, a liquid resist having translucency, for example, is applied, after which it is exposed to light and developed.

Next, the bridge wiring part 20 is formed so as to pass over the top of the island-shaped insulating part 30. The bridge wiring part 20 is formed by photolithography and etching or by screen printing. When the bridge wiring part 20 is to be formed by photolithography and etching, a laminated body of an ITO layer, a meal layer, and an ITO layer is formed by sputtering and a resist is formed on the laminated body. After the resist is patterned by being exposed to light and developed, the laminated body is etched. After that, the resist is stripped. Thus, the bridge wiring part 20 is formed that passes over the top of the island-shaped insulating part 30 in such a way that one of both ends of the bridge wiring part 20 is electrically continuous to one of two adjacent second island-shaped electrode parts 121 and the other end is electrically continuous to the other second island-shaped electrode part 121.

When the bridge wiring part 20 is to be formed by screen printing, a conductive film including silver nano-wires, for example, is screen-printed on the island-shaped insulating part 30. Then, the silver nano-wire conductive film is annealed and roll-pressed. In this case, flash lamp annealing may be performed. Thus, the bridge wiring part 20 is formed on the island-shaped insulating part 30.

Next, the inter-layer elastic member 40 is pasted to the entire surface with an OCA. The protective member 50 is pasted on this inter-layer elastic member 40. This completes the capacitive sensor 1.

In the above example, the load detection wire 13 has been formed in the same process and from the same material as the first electrode 11 and second electrode 12. However, the load detection wire 13 may be formed in a different process and from a different material from the first electrode 11 and second electrode 12. In this case, the material of the load detection wire 13 may be the same as the material of the bridge wiring part 20. This simplifies the manufacturing process of the load detection wire 13.

Second Embodiment

Figure 3:
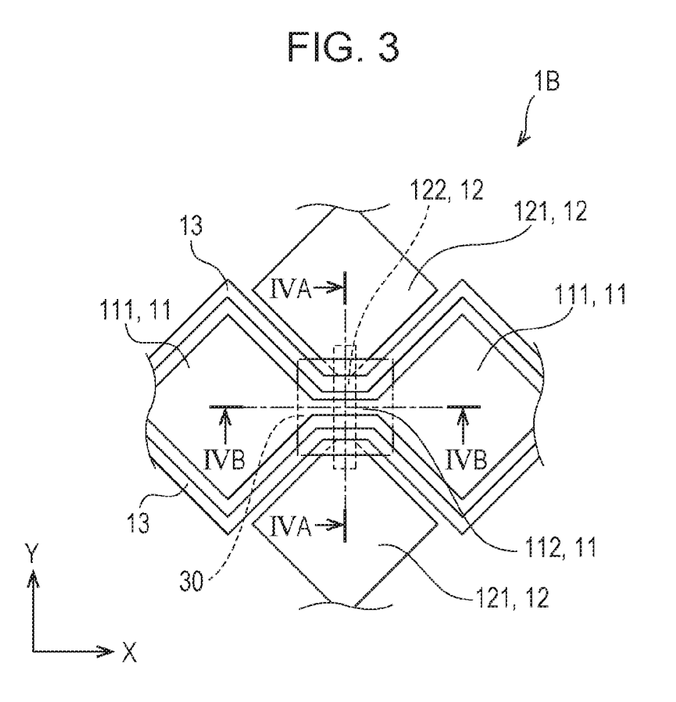
FIG. 3 is a plan view illustrating a capacitive sensor according to a second embodiment.

FIG. 3 is a plan view illustrating a capacitive sensor according to a second embodiment. Specifically, FIG. 3 is an enlarged view of a portion equivalent to the portion IB in FIG. 1A.

In the capacitive sensor 1B according to this embodiment, a linkage part 112 of the first electrode 11 and the load detection wire 13 are provided on the island-shaped insulating part 30 at an intersection portion between the first electrode 11 and the second electrode 12.

The linkage part 112 is provided between two adjacent first island-shaped electrode parts 111 of the first electrode 11. The linkage part 112 is provided so as to link the opposing corners of the two adjacent first island-shaped electrode parts 111. A bridge part 122 is provided between two adjacent second island-shaped electrode parts 121 of the second electrode 12. The bridge part 122 is formed on the base material 10 so as to link the lower surfaces of the opposing corners of the two adjacent second island-shaped electrode parts 121.

At the intersection portion between the first electrode 11 and the second electrode 12, the linkage part 112 is provided so as to intersect the bridge part 122 with the island-shaped insulating part 30 interposed between them. At the intersection portion between the first electrode 11 and the second electrode 12, the load detection wire 13 is provided so as to intersect the bridge part 122 with the island-shaped insulating part 30 interposed between them.

Figure 4A:
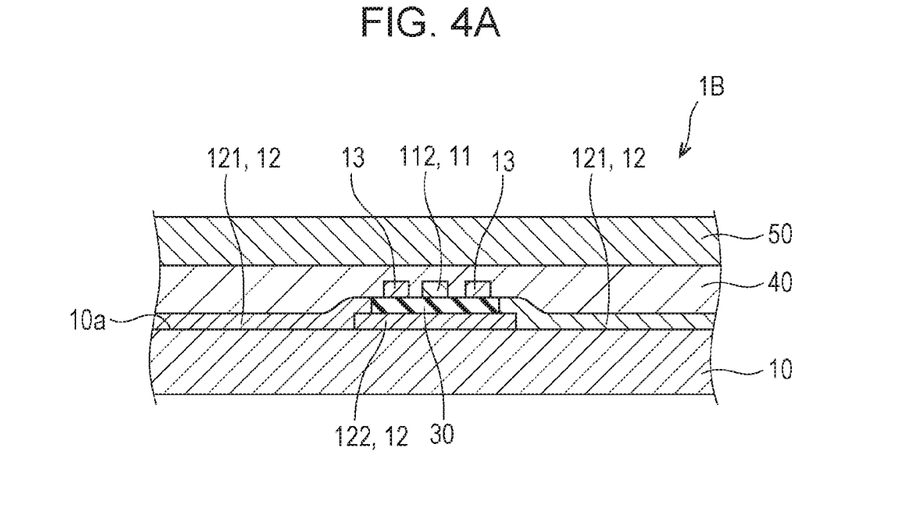
FIGS. 4A and 4B are each a cross-sectional view of part of the capacitive sensor.
Figure 4B:
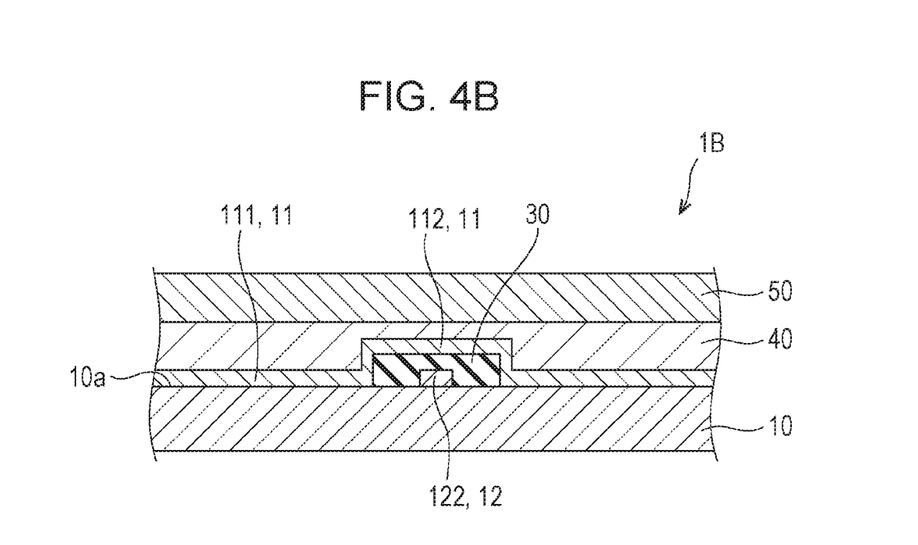

FIGS. 4A and 4B are each a cross-sectional view of part of the capacitive sensor. FIG. 4A is a cross sectional view taken along line IVA-IVA in FIG. 3. FIG. 4B is a cross sectional view taken along line IVB-IVB in FIG. 3.

The first island-shaped electrode parts 111 of the first electrode 11 and the second island-shaped electrode parts 121 of the second electrode 12 are placed on the surface 10a of the base material 10. At the intersection portion between the first electrode 11 and the second electrode 12, the linkage part 112 of the first electrode 11 and the bridge part 122 of the second electrode 12 intersect each other with the island-shaped insulating part 30 interposed between them and are electrically insulated from each other.

The island-shaped insulating part 30 is provided so as to cover the top of the bridge part 122 of the second electrode 12. The linkage part 112 of the first electrode 11 and load detection wire 13 are provided so as to pass over the top of the island-shaped insulating part 30. An end (corner) of the second island-shaped electrode part 121 rides on an end of the bridge part 122, which is exposed from the island-shaped insulating part 30, and is connected to the bridge part 122. Since, at the position of the island-shaped insulating part 30, the load detection wire 13 is provided on the island-shaped insulating part 30 protruding from the surface 10a of the base material 10, when pressure is applied with a finger from above the protective member 50, the load detection wire 13 is intensively pressurized by the protrusion of the. Therefore, even if the load is minute, the change in the electric resistance value of the load detection wire 13 can be increased.

Third Embodiment

Figure 5A:
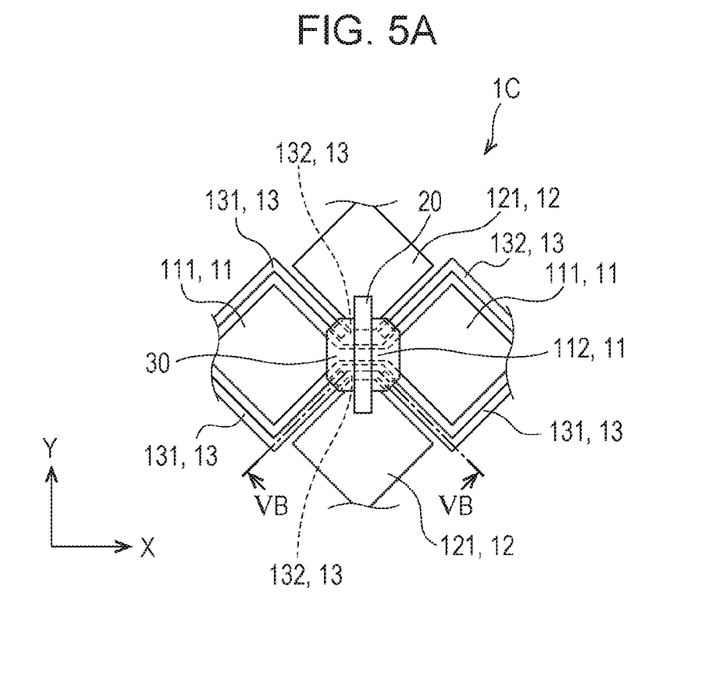
FIGS. 5A and 5B each illustrate a capacitive sensor according to a third embodiment.
Figure 5B:
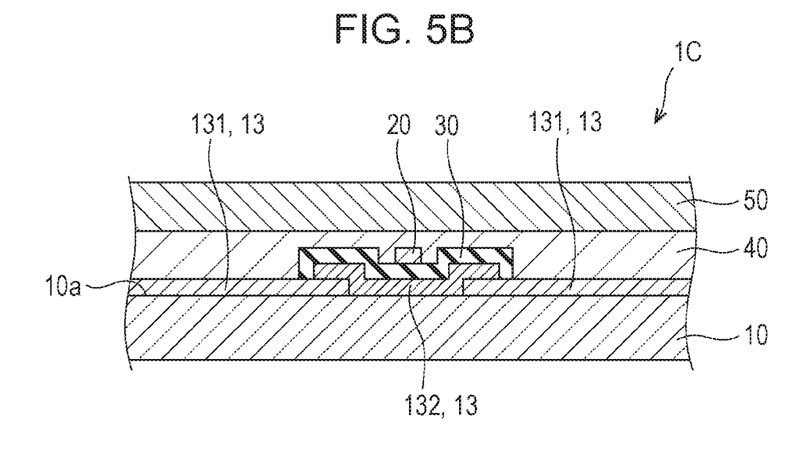

FIGS. 5A and 5B each illustrate a capacitive sensor according to a third embodiment. FIG. 5A is an enlarged view of a portion equivalent to the portion IB in FIG. 1A. FIG. 5B is a cross sectional view taken along line VB in FIG. 5A.

In the capacitive sensor 1C according to this embodiment, the load detection wire 13 is divided at the position of the island-shaped insulating part 30. The load detection wire 13 preferably has first wiring parts 131 and a second wiring part 132.

The second wiring part 132 is disposed below the island-shaped insulating part 30 and between the divided first wiring parts 131. One of both ends of the second wiring part 132 overlaps with an end of one divided first wiring parts 131, and the other end of the second wiring part 132 overlaps with an end of another divided first wiring parts 131. The bridge wiring part 20 is provided so as to pass over the second wiring part 132 with the island-shaped insulating part 30 interposed between them.

That is, when viewed from above the base material 10, the capacitive sensor 1C preferably has a portion at which part of the bridge wiring part 20, part of the island-shaped insulating part 30, and part of the second wiring part 132 overlap with one another at the position of the bridge wiring part 20. At positions other than the bridge wiring part 20, the capacitive sensor 1C preferably has portions at which part of the first wiring part 131 and part of the second wiring part 132 overlap with each other. The bridge wiring part 20 is disposed in the recess of the island-shaped insulating part 30 (at the recess, the first wiring part 131 and second wiring part 132 do not overlap with each other). Thus, the thickness of the laminated layers can be reduced at a position at which the bridge wiring part 20 overlaps with the island-shaped insulating part 30 and second wiring part 132.

According to the structure as described above, the load detection wire 13 is intensively pressurized at the protrusion of the bridge wiring part 20 and the portions at which the first wiring part 131 and second wiring part 132 overlap with each other. That is, at the position of the bridge wiring part 20, a pressing force applied from above the protective member 50 is intensively applied to the load detection wire 13 due to the overlap of part of the bridge wiring part 20 and part of the second wiring part 132. At other portions, on the island-shaped insulating part 30, at which the bridge wiring part 20 is not present, the pressing force is intensively applied to the load detection wire 13 due to the overlap of part of the island-shaped insulating part 30, part of the second wiring part 132, and part of the first wiring part 131. Thus, even if the load is minute, the change in the electric resistance value of the load detection wire 13 can be increased.

Fourth Embodiment

Figure 6A:
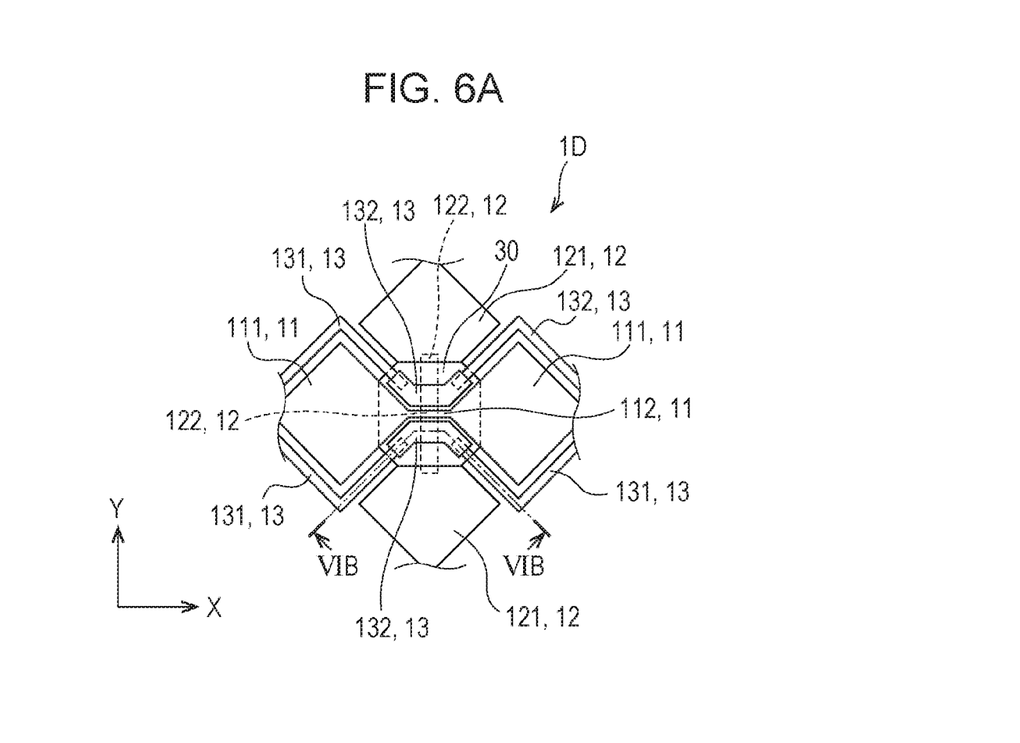
FIGS. 6A and 6B each illustrate a capacitive sensor according to a fourth embodiment.
Figure 6B:
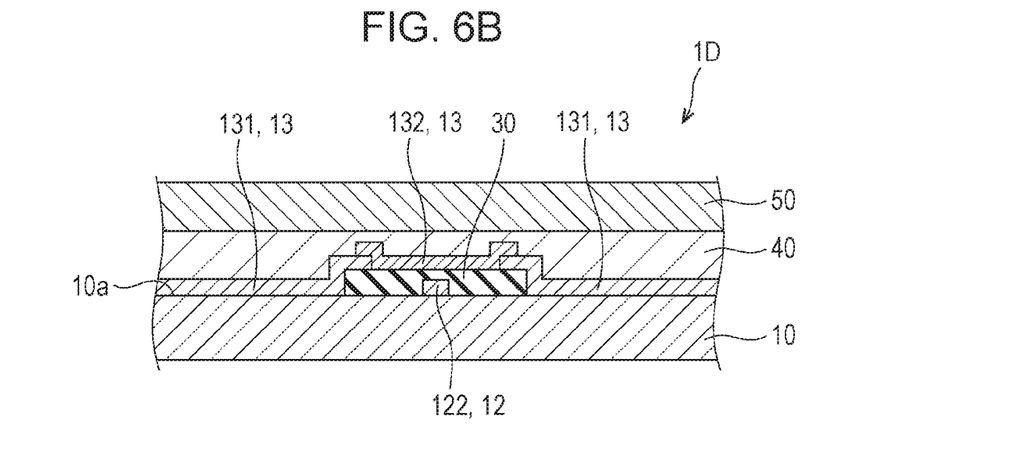

FIGS. 6A and 6B each illustrate a capacitive sensor according to a fourth embodiment. FIG. 6A is an enlarged view of a portion equivalent to the portion IB in FIG. 1A. FIG. 6B is a cross sectional view taken along line VIB in FIG. 6A.

In the capacitive sensor 1D in this embodiment, the load detection wire 13 is divided into first wiring parts 131 and a second wiring part 132.

At an intersection portion between the first electrode 11 and the second electrode 12, the bridge part 122 of the second electrode 12 and the linkage part 112 of the first electrode 11 are provided so as to intersect each other with the island-shaped insulating part 30 interposed between them. The island-shaped insulating part 30 is provided so as to cover the top of the bridge part 122 of the second electrode 12 disposed on the surface 10a of the base material 10. The second island-shaped electrode part 121 rides on an end of the bridge part 122, which is exposed from the island-shaped insulating part 30, and is connected to the bridge part 122. The linkage part 112 of the first electrode 11 is provided so as to pass over the island-shaped insulating part 30. The first wiring part 131 of the load detection wire 13 is provided so as to ride on an end of the island-shaped insulating part 30 from the surface 10a of the base material 10. The second wiring part 132 of the load detection wire 13 is disposed on the island-shaped insulating part 30. Each end of the second wiring part 132 overlaps with an end of one first wiring part 131 disposed on the island-shaped insulating part 30.

That is, when viewed from above the base material 10, the capacitive sensor 1D has a portion at which part of the second wiring part 132, part of the island-shaped insulating part 30, and part of the bridge part 122 overlap with one another at the position of the island-shaped insulating part 30. At positions other than the island-shaped insulating part 30, the capacitive sensor 1D has portions at which part of the first wiring part 131 and part of the second wiring part 132 overlap with each other.

According to the structure as described above, the load detection wire 13 is intensively pressurized at the protrusion of the island-shaped insulating part 30 and the portions at which the first wiring part 131 and second wiring part 132 overlap with each other. That is, at the position of the island-shaped insulating part 30, a pressing force applied from above the protective member 50 is intensively applied to the load detection wire 13 due to the overlap of part of the island-shaped insulating part 30 and part of the second wiring part 132. Thus, even if the load is minute, the change in the electric resistance value of the load detection wire 13 can be increased.

As described above, according to the embodiments, in the capacitive sensors 1, 1B, 1C, and 1D that can detect both a position and a load, it is possible to reduce the thickness of the input device and improve waterproof and dustproof performance, without providing a movable space used to detect a load.

So far, embodiments of the present invention have been described. However, the present invention is not limited to examples in these embodiments. For example, the scope of the present invention also includes embodiments obtained as a result of adding or deleting constituent element to or from the above embodiments, performing design changes to the above embodiments, or appropriately combining features in the above embodiments; the additions, deletions, design changes, or combination is effected by a person having ordinary skill in the art without departing from the intended scope of the present invention.

What is claimed is:

1. An input device comprising:
a base having a first surface and a second surface opposite to the first surface;
a position detection part provided on the first surface of the base, the position detection part having a plurality detection electrodes, the plurality of detection electrodes including:
a plurality of first electrodes extending in a first direction, each of the first electrodes including:
a plurality of first island-shaped electrode parts; and
a plurality of linkage parts each connecting adjacent two of the first island-shaped electrode parts; and
a plurality of second electrodes extending in a second direction crossing the first direction, each of the second electrodes including:
a plurality of second island-shaped electrode parts; and
a plurality of bridge wiring portions each connecting adjacent two of the second island-shaped electrode parts and crossing corresponding one of the linkage parts of the first electrodes;
at least one load detection wire provided in the position detection part between the plurality of first detection electrodes so as to cross the bridge wiring portions, an electric resistance value of the load detection wire changing depending on a pressure applied thereto; and
an island-shaped insulating part provided in each intersection in which the bridge wiring portion crosses the corresponding linkage part and the load detection wire, the island-shaped insulating part electrically insulating the bridge wiring portion from the linkage part and the load detection wire,
wherein in an area of the position detection part where the island-shaped insulating part is not provided, the load detection wire, the plurality of first island-shaped electrode parts, and the plurality of second island-shaped electrode parts are formed in a same first layer on the first surface, and, when viewed from above the base, the load detection wire is disposed between one of the first island-shaped electrode parts and one of the second island-shaped electrode parts which is adjacent to the one of the first island-shaped electrode parts such that the load detection wire does not cross the second island-shaped electrode parts,
wherein in each intersection, when viewed from above the base, the load detection wire is disposed between the first island-shaped electrode part and the second island-shaped electrode part such that the load detection wire does not cross the second island-shaped electrode part while the load detection wire crosses the island-shaped insulating part,
and wherein the island-shaped insulating part in each intersection provides a protrusion formed from one of the adjacent two of the second island-shaped electrode parts to the other of the adjacent two of the second island-shaped electrode parts across the corresponding linkage part and the load detection wire disposed between the adjacent two of the second island-shaped electrode parts, the protrusion protruding from the first surface above the same first layer in which the first island-shaped electrode parts and the second island-shaped electrode parts are formed.

2. The input device according to claim 1, wherein the load detection wire substantially extends in the first direction.

3. The input device according to claim 2, wherein a plurality of load detection wires are provided at a predetermined interval.

4. The input device according to claim 1, wherein the load detection wire and the bridge wiring portions are formed of a same material.

5. The input device according to claim 1,
wherein each load detection wire includes:
a plurality of first wiring portions; and
a plurality of second wiring portions each provided between and connecting to adjacent two of the plurality of first wiring portions,
and wherein, in each intersection, when viewed from above the base, the bridge wiring portion, the island-shaped insulating part, and the second wiring portion are superimposed with one another, the second wiring portion connecting to and overlapping with the first wiring portion at positions crossing the island-shaped insulating part and avoiding the bridge wiring portion.

6. The input device according to claim 1, further comprising:
an elastic member provided over the position detection part.

7. The input device according to claim 1,
wherein each load detection wire includes:
a plurality of first wiring portions; and
a plurality of second wiring portions each provided between and connecting to adjacent two of the plurality of first wiring portions,
and wherein, in each intersection, when viewed from above the base, the second wiring portion connecting to and overlapping with the first wiring portion at positions crossing the island-shaped insulating part and avoiding the bridge wiring portion.

8. The input device according to claim 1,
wherein, in each intersection, the bridge wiring portion, the island-shaped insulating part, and the load detection wire are superimposed with one another.

9. An input device comprising:
a base having a first surface and a second surface opposite to the first surface;
a position detection part provided on the first surface of the base, the position detection part having a plurality detection electrodes, the plurality of detection electrodes including:
a plurality of first electrodes extending in a first direction; and
a plurality of second electrodes extending in a second direction crossing the first direction, each of the second electrodes including:
a plurality of second island-shaped electrode parts; and
a plurality of bridge wiring portions each connecting adjacent two of the second island-shaped electrode parts and crossing corresponding one of the first electrodes;
an island-shaped insulating part provided in each intersection in which the bridge wiring portion crosses the first electrode;
at least one load detection wire provided in the position detection part between the plurality of first detection electrodes, an electric resistance value of the load detection wire changing depending on a pressure applied thereto; and
wherein in an area of the position detection part where the island-shaped insulating part is not provided, the load detection wire, the plurality of first electrodes, and the plurality of second island-shaped electrode parts are formed in a same first layer on the first surface, and, when viewed from above the base, the load detection wire is disposed between one of the plurality of first electrodes and the second island-shaped electrode parts which are adjacent to the one of the plurality of first electrodes such that the load detection wire does not cross the second island-shaped electrode parts,
wherein, in each intersection, when viewed from above the base, the load detection wire is disposed between the first electrode and the second island-shaped electrode part such that the load detection wire does not cross the second island-shaped electrode part, while the load detection wire crosses the island-shaped insulating part, whereby the island-shaped insulating part provides a protrusion protruding from the first surface above the same first layer in which the first electrodes and the second island-shaped electrode parts are formed.

10. The input device according to claim 9,
wherein each load detection wire includes:
a plurality of first wiring portions; and
a plurality of second wiring portions each provided between and connecting to adjacent two of the plurality of first wiring portions,
and wherein, in each intersection, when viewed from above the base, the bridge wiring portion, the island-shaped insulating part, and the second wiring portion are superimposed with one another, the second wiring portion connecting to and overlapping with the first wiring portion at positions crossing the island-shaped insulating part and avoiding the bridge wiring portion.

11. The input device according to claim 9,
wherein each load detection wire includes:
a plurality of first wiring portions; and
a plurality of second wiring portions each provided between and connecting to adjacent two of the plurality of first wiring portions,
and wherein, in each intersection, when viewed from above the base, the second wiring portion connecting to and overlapping with the first wiring portion at positions crossing the island-shaped insulating part and avoiding the bridge wiring portion.

12. The input device according to claim 11,
wherein, in each intersection, when viewed from above the base, the bridge wiring portion, the island-shaped insulating part, and the second wiring portion are superimposed with one another.

13. The input device according to claim 9, wherein the load detection wire substantially extends in the first direction.

14. The input device according to claim 13, wherein a plurality of load detection wires are provided at a predetermined interval.

15. The input device according to claim 9, wherein the load detection wire and the bridge wiring portions are formed of a same material.

16. The input device according to claim 9, further comprising:
an elastic member provided over the position detection part.

17. An input device comprising:
a base having a first surface and a second surface opposite to the first surface;
a position detection part provided on the first surface of the base, the position detection part having a plurality detection electrodes, the plurality of detection electrodes including:
a plurality of first electrodes extending in a first direction; and
a plurality of second electrodes extending in a second direction crossing the first direction, each of the second electrodes including:
a plurality of second island-shaped electrode parts; and
a plurality of bridge wiring portions each connecting adjacent two of the second island-shaped electrode parts and crossing corresponding one of the first electrodes;
an island-shaped insulating part provided in each intersection in which the bridge wiring portion crosses the first electrode;
at least one load detection wire provided in the position detection part between the plurality of first detection electrodes, an electric resistance value of the load detection wire changing depending on a pressure applied thereto, wherein in an area of the position detection part where the island-shaped insulating part is not provided, the load detection wire, the plurality of first electrodes, and the plurality of second island-shaped electrode parts are formed in a same first layer on the first surface, and, when viewed from above the base, the load detection wire is disposed between one of the plurality of first electrodes and the second island-shaped electrode parts which is adjacent to the one of the plurality of first electrodes such that the load detection wire does not cross the second island-shaped electrode parts, wherein, in each intersection, when viewed from above the base, the load detection wire is disposed between the first electrode and the second island-shaped electrode part such that the load detection wire does not cross the second island-shaped electrode part, while the load detection wire crosses the island-shaped insulating part, whereby the island-shaped insulating part provides a protrusion protruding from the first surface above the first layer in which the first electrodes and the second island-shaped electrode parts are formed, wherein each load detection wire includes:
a plurality of first wiring portions; and
a plurality of second wiring portions each provided between and connecting to adjacent two of the plurality of first wiring portions, and wherein, in each intersection, when viewed from above the base, the second wiring portion connects to and overlaps with the first wiring portion at positions crossing the island-shaped insulating part.

18. The input device according to claim 17, wherein the load detection wire substantially extends in the first direction.

19. The input device according to claim 18, wherein a plurality of load detection wires are provided at a predetermined interval.

20. The input device according to claim 17, wherein the load detection wire and the bridge wiring portions are formed of a same material.

21. The input device according to claim 17, further comprising:
an elastic member provided over the position detection part.

* * * * *